| United States Patent [19] | [11] | 4,374,232 |
|---|---|---|
| Davis | [45] | Feb. 15, 1983 |

[54] GRAFT COPOLYMER MEMBRANE AND PROCESSES OF MANUFACTURING AND USING THE SAME

[75] Inventor: William J. Davis, Wyomissing, Pa.

[73] Assignee: Gelman Sciences Inc., Ann Arbor, Mich.

[21] Appl. No.: 263,222

[22] Filed: May 13, 1981

Related U.S. Application Data

[62] Division of Ser. No. 6,909, Jan. 26, 1979, Pat. No. 4,287,275.

[51] Int. Cl.³ .......................................... C08F 279/00
[52] U.S. Cl. ................................... 525/243; 525/263; 525/301
[58] Field of Search ............... 525/301, 304, 305, 316, 525/263, 243

[56] References Cited

U.S. PATENT DOCUMENTS

| 3,644,584 | 2/1972 | Fryd | 525/301 |
|---|---|---|---|
| 3,935,136 | 1/1976 | Childers | 525/304 |
| 3,936,411 | 2/1976 | Hahn | 525/305 |
| 4,122,133 | 10/1978 | Bernstein | 525/301 |
| 4,201,641 | 5/1980 | Gotoda | 525/301 |
| 4,279,795 | 7/1981 | Yamashita | 525/301 |
| 4,281,083 | 7/1981 | Arbit | 525/304 |

*Primary Examiner*—Paul R. Michl
*Attorney, Agent, or Firm*—Reising, Ethington, Barnard, Perry & Brooks

[57] ABSTRACT

A cast film, sheet or coating of a crosslinked graft copolymer of an organic polymeric substrate and an ethylenically unsaturated organic monomer is formed by effecting the graft copolymerization while the polymeric substrate and monomer are in solution in a solvent thereby to form the crosslinked graft copolymer in the form of a gel, subjecting the gel to high shear forces to convert it to a thixotropic suspension, forming the thixotropic suspension into a layer, and removing the solvent from the layer.

21 Claims, No Drawings

GRAFT COPOLYMER MEMBRANE AND PROCESSES OF MANUFACTURING AND USING THE SAME

This is a division, of application Ser. No. 006,909, filed Jan. 26, 1979 now U.S. Pat. No. 4,287,275.

The present invention relates to graft copolymers and to processes for making and using graft copolymers. The present invention, in particular, provides new separators for alkaline energy cells.

Graft copolymers of an inert polymeric substrate and a copolymerizable monomer are well known. In prior art processes, the graft copolymerization of the monomer and polymer substrate is initiated by free radicals created by free radical catalysts or by low or high energy radiation, such as obtained from an election accelerator or a radioactive material. U.S. Pat. No. 3,188,229 describes typical radiation induced graft copolymerizations. Graft copolymers have also been prepared by use of a low energy source to create free radical sites on the polymeric substrate, such as an electrical discharge in an initiator gas followed by grafting of the monomer. See e.g. U.S. Pat. No. 3,600,122.

Graft copolymers produced by prior art processes are often highly crosslinked, due to the inter-chain and intra-chain linkages resulting from the large number of free radical sites and/or from the use of cross-linking agents, such as divinylbenzene. Cross-linking tends to increase dimensional stability and tensile strength, and is often desirable. Cross-linked graft copolymers are of increased chemical inertness, and are generally insoluble in organic solvents.

Cast polymeric films are usually formed by dissolving or suspending the polymer in a suitable solvent or suspending agent, and removing the solvent or suspending agent, as by drying. Cast films or sheets of cross-linked graft copolymers would not appear to be possible, because of the insolubility of the graft copolymers as discussed above. Surprisingly, it has now been found that cast films or sheets of crosslinked graft copolymers can be prepared by use of the process of the present invention. Such cast films and sheets of graft copolymers find a wide variety of uses, e.g. as ion-exchange membranes.

Thus, in accordance with the present invention, a cast film or sheet of a cross-linked graft copolymer can be prepared by forming a reaction mixture comprising an organic polymeric substrate and an ethylenically unsaturated monomer dissolved in an organic solvent, initiating graft copolymerization of said polymeric substrate and said monomer by forming free radicals on said polymeric substrate in said reaction mixture and copolymerizing said polymeric substrate and said monomer while dissolved in said solvent (including cross linking the polymeric substrate itself) to form cross-linked graft copolymer of said polymeric substrate and said monomer in the form of a gel, and subjecting said gelled graft copolymer to high shear forces to form a thixotropic suspension containing said graft copolymer. The thixotropic suspension, preferably after removal of some solvent to raise the solids content, is used to cast films, sheets or coatings of crosslinked graft copolymer.

The process according to the present invention results in a highly desirable product by proceeding away from the teachings in the art in two respects. First, the grafting and crosslinking reactions are carried out while the polymeric substrate and monomer are dissolved in the solvent. This is specifically taught to be avoided in U.K. Pat. No. 876,535, which warns that active sites on the polymer will be destroyed by dissolving the polymer in solution. Second, the graft copolymerization is allowed to form a crosslinked gel, a product form thought by those skilled in the art, to be valueless.

The present invention also provides a cast film or sheet of a cross-linked graft copolymer of an organic polymeric substrate and an ethylenically unsaturated monomer.

Where the ethylenically unsaturated monomer contains ion-exchange groups, a valuable ion-exchange membrane is provided. Such ion-exchange membranes are useful in fuel cells, in water purification and dialysis, as battery separators, and for other applications based upon ion-exchange.

In particular, the present invention provides an improved separator for alkaline energy cells, comprising a cast film or sheet of cross-linked graft copolymer of an organic polymeric substrate and an ethylenically unsaturated carboxylic acid. In such cells, a separator is employed between adjacent electrodes of opposite polarity, and the separator according to the invention offers substantial advantages over prior art battery separators.

At the heart of the present invention is the cast film or sheet of the graft copolymer, and its process of production. In order to realize the advantages of the present invention, it is necessary to dissolve the polymeric substrate and monomer in a solvent so that the cross-linking and graft copolymerization occurs while the polymeric substrate is solvated. It is also important to allow the cross-linked graft copolymer to gel followed by subjecting the gel to high shear forces to convert the gel into a thixotropic suspension.

Any polymer that is amenable to graft copolymerization can be used as the polymeric substrate in the present invention. A wide variety of polymers have previously been proposed for use in forming graft copolymers through free radical catalysis, as by forming free radicals by ionizing radiation or electrical discharge or by free radical catalysts, and these polymers are useful herein. Thus, useful polymers includes linear, branched, isotatic and atatic homopolymers and copolymers of olefins, polyesters, polyvinylchloride, polyvinylidene chloride, polyvinylalcohol, polystyrene, polyvinylketones, polyamides, polyurethanes, polyvinylethers, polyacrylonitrile, polybutadiene, isoprene and the like. Copolymers of more than one monomer are also useful. The polymeric substrate can be of low to high molecular weight, good results having been obtained over a range of several orders of magnitude. Usually, the polymeric substrate will have a molecular weight of from about 10,000 to 2 or 3 million.

The organic monomer for the graft copolymer contains ethylenic unsaturation and may be aliphatic, aromatic, cycloaliphatic or araliphatic and may contain functional groups, such as acidic and basic groups. Ethylenically unsaturated acids, alcohols, ethers, ketones, esters, aldehydes, isocyanates, sulfonates, mercaptans, thioethers, disulfides, nitriles, nitro compounds, amines, amides and halides have previously been proposed as monomers for graft copolymers, and can be used herein. See, for example, U.S. Pat. No. 3,188,165, for a discussion of suitable monomers for graft copolymerization. The monomer for the graft copolymers of the invention can be two or more monomers.

The choice of the polymeric substrate and ethylenically unsaturated monomer is determined by the application intended for that cast film or sheet. However, as can be seen from U.S. Pat. Nos. 3,188,165 and 3,600,122, graft copolymers are prepared from a wide selection of polymers and monomers.

Similarly, the ratio of polymeric substrate to monomer can be widely varied. Generally, the graft copolymer will be based upon a ratio of polymeric substrate to monomer of from about 50:1 to about 1:10.

The polymeric substrate and monomer are dissolved in a solvent at elevated temperature. Any organic material capable of dissolving the polymeric substrate and monomer that is stable at elevated temperature can be employed, such as the halogenated hydrocarbons, e.g. perchloroethylene, aromatic hydrocarbons, e.g. benzene and toluene, dimethylformamide, demethylsulfoxide, and the like. A chain transfer agent may also be included if the solvent does not function as such. Suitable chain transfer agents include mercaptans, halogenated lower alkyls, e.g. chloroform, acrylonitrile, vinyl esters and the like. Perchloroethylene functions as a chain transfer agent and a solvent, and is presently preferred.

Since the polymeric substrates are generally difficultly soluble at ambient temperature, it is presently preferred to dissolve the polymeric material in the solvent at elevated temperature, such as at least about 60° C., more preferably from about 80° to about 170° C. The temperature chosen will be determined empirically for a given polymermonomer system.

The graft copolymerization is initiated by creation of free radicals, either by irradiation of the polymer substrate and monomer while they are dissolved in the solvent, or by the use of free radical catalysts. As is known, ionizing radiation to initiate graft copolymerization may be of low or high energy levels, such as from a radioactive source, X-rays, a Van de Graaff generator, a particle accelerator and the like.

It is preferred to initiate the grafting reaction by the use of free radical catalysts, such as peroxide or azo catalysts most preferably peroxide catalysts. Useful peroxide catalysts include alkyl, acyl and ketone peroxides, hydroperoxides, peresters and peroxy carbonates, such as t-butyl peroxide, t-butyl perbenzoate, benzoyl peroxide, acetyl peroxide, 2,4-dichlorobenzoyl peroxide, di-isobutylryl peroxide, di-isononanoyl peroxide, decanoyl peroxide, and lauroyl peroxide. Useful azo catalysts include azo-bisisobutylnitrile, 2,2'-azo-bis-isobutyronitrile, 2-cyano-2-propyl-azo-formamide, 2,2-azo-bis-2-methylbutyronitrile, triazobenzene, azo-bis-isobutyramidine, 1,1'-azo,bis-cumene and the like. The graft copolymerization and crosslinking reactions proceed to the gel state so rapidly, e.g. 1 to 5 minutes, that the selection of useful catalysts can be empirically determined simply and quickly. As a practical matter, the catalyst will generally be used in an amount of at least about 0.1%, such as from about 0.1% to about 10% by weight of the polymeric substrate and monomer, depending upon solution concentration and the amount of inhibitors present. In some cases, more than 10% or less than 0.1% can be used. While not required, the graft copolymerization reaction can be carried out in the absence of air, such as in an atmosphere of an inert gas, e.g. nitrogen.

The graft copolymerization reaction is exothermic and rapid. A few minutes after the free radicals are created, the reaction mass shows signs of gelation. The gel can then be transferred to a high shear device, as e.g. a Waring blender, where it is subjected to high shear forces until it is a smooth, thixotropic suspension, generally from about 1 to about 3 minutes. Temperatures of from about 20° to about 100° C. are generally used during shearing with higher temperatures acting to soften the gel and thus making it easier to shear.

While the thixotropic suspension can be used as such for casting films, sheets and coatings, it is preferred to remove some of the solvent, as by evaporation or centrifuging, so as to increase the solids content of the casting liquid. This can be accomplished in a simple manner without the need for heating, by allowing the thixotropic suspension to regel, e.g. by storage of the thixotropic liquid reaction mass at ambient temperatures for 1 to 24 hours. During the regelling, solvent exudes from the gel and can be removed merely by decanting to provide a second gel of higher solids content. This second gel is easily reformed to a thixotropic suspension by vigorous stirring for about 1 to 5 minutes. The thixotropic suspension so obtained has a higher solids concentration due to solvent removal and is directly useful for casting the crosslinked graft copolymer as a film, sheet or coating.

One interesting modification of the process of this invention is to mix a solution of polymeric material in the solvent with the first gel before it is sheared. This enables one to obtain very high ratios of polymeric material to monomer.

Casting the film or sheet can be carried out by a variety of techniques. Thus, the thixotropic suspension may be cast onto a release surface, such as Teflon-coated fiberglass, and then cured to a dry film by solvent removal at elevated temperature. Useful curing schedules are empirically determined, but generally temperatures are kept below the boiling point of the solvent until the film or sheet is almost dry. Fusion of the material occurs while the graft copolymer is still solvated. After full cure, i.e. complete removal of solvent, the film can be heated above the softening point of the graft copolymer. Indeed, the film is heat sealable. Since the graft copolymer is highly crosslinked, the resulting graft copolymer is dimensionally and thermally stable.

Alternatively, the liquid may be coated on a support to which the graft copolymer film will adhere, thus forming a laminate. In such a case, the liquid is cast directly onto the support and cured.

Furthermore, the liquid can be coated onto a substrate, such as by dipping an object into the liquid followed by curing. It can be seen that the graft copolymer-containing suspension may be handled as a film-forming liquid or coating composition.

An important use of the graft copolymer films, sheets and coatings of the present invention is as a separator in an alkaline battery cell. In such cases, the separator will be a graft copolymer containing copolymerized units of a homopolymer or copolymer of an olefin, ester, amide or vinyl halide, and units of an ethylenically unsaturated acid or a salt, anhydride or ester thereof that will hydrolyze or ionize to provide conductive groups in the aqueous alkaline electrolyte of the battery. Suitable polymeric substrates include isotatic or atatic polyolefin polymers and copolymers of lower olefins, such as an olefin of from 2 to 6 carbon atoms. Suitable monomers include acrylic acid, methacrylic acid and other ethylenically unsaturated carboxylic acids, esters or anhydrides. After formation of the graft copolymer, the functional groups can be converted to the salt form by immersion of the graft copolymer in aqueous alkaline solution, e.g. aqueous 40% KOH. When forming graft copolymers for use as battery separators, it is preferred to use free radical catalysts, preferably peroxide catalysts, to initiate graft copolymerization.

The graft copolymer separators of the present invention may be used in primary or secondary cells, comprising an aqueous alkaline electrolyte, usually 30 to 45% aqueous KOH, and at least one pair of oppositely charged electrodes. The positive electrode is usually silver oxide, mercuric oxide or nickel hydroxide and the negative electrode is usually zinc or cadmium, but any of the known electrodes may be used. Such pairs as silver-zinc, mercury-zinc, silver-cadmium, nickel-zinc and nickel-cadmium may be employed. Each electrode may be a single plate or a plurality of plates, as is known. The graft copolymer battery separator is placed between adjacent electrodes of opposite polarity in place of the conventional cellulose or graft copolymer membranes of the prior art.

The disadvantages of cellulosic membranes are detailed in U.S. Pat. No. 3,427,206, which provides a graft copolymer membrane as the separator, the membrane having been formed by irradiating a film of polyolefin swollen with solvent and unsaturated acid mononer. Surprisingly, the graft copolymer films, sheets and coatings according to the present invention have lower electrical resistance and better oxidation resistance than the membranes of U.S. Pat. No. 3,427,206. Indeed, the desired electrical resistance can be engineered into the membranes of the present invention by control over the ratio of polymeric substrate to monomeric acid. As the polymer content decreases, so does the electrical resistance. If electrical resistance in 40% aqueous KOH (milliohms-in$^2$ per mil of thickness) is plotted against percent polymeric substrate based on the total weight of polymer plus monomer grafted thereto, the curve would be assymptotic with respect to the abscissa and to 100% polymer component, approaching infinite resistance as the polymeric component approaches 100% and approaching zero resistance as the polymeric component approaches 0%. As a practical matter, a polymeric substrate content of about 20% presently appears to be the useful lower limit, although for certain specialized applications, even less can be used.

The present invention is illustrated by the following examples, which describe the preparation of ion exchange membranes, and more particularly battery separators. Unless otherwise specified, all parts and proportions described in this specification and in the appended claims are by weight.

EXAMPLE I

Into a stainless steel vessel were charged 139 parts of high density polyethylene (Alathon 7030) having a melt index of 2.8 and a density of 0.96 and 6810 parts of perchloroethylene. The vessel is held in an oil bath maintained at 110° C. There is then added, with stirring, 229 parts of acrylic acid, and four minutes later, 12 parts of benzoyl peroxide dissolved in 200 parts of perchloroethylene. After 1 to 2 minutes a haze appears, the stirrer is removed from the vessel, and the vessel removed from the oil bath. The gelling mass in the vessel is chopped with a spatula for 2 to 3 minutes, and the reaction mass allowed to stand. A maximum temperature of 118°–120° C. is obtained. When the mass cools to about 90° to 95° C., it is transferred to a Waring blender and subjected to high speed shearing for 1 to 3 minutes until a thixotropic liquid is obtained.

The liquid is allowed to stand overnight, whereupon a gel is formed. Excess solvent is decanted, and the gel is again subjected to high speed shearing for 1 to 5 minutes to form a thixotropic liquid that is cast onto the surface of a Telfon-coated fiberglas plate to a thickness of several mils. Three samples are prepared so as to give three different thicknesses of the dry film, namely, 1, 0, 2.0 and 4.2 mils dry thickness. These samples are cured by gradually increasing temperatures from 90° to 120° C. over the first 12 minutes, and then 120°–130° C. over 8 minutes. The resulting membranes are cast films of a crosslinked graft copolymer of 37.8% polyethylene and 62.2% acrylic acid.

The three samples, designated 1008, 2016 and 4244, as well as PERMION 2291, 40/20, a graft copolymer membrane prepared according to U.S. Pat. No. 3,427,206, and cellophane, PUDO 193, a battery grade cellulose produced by DuPont, were tested at 30% and 40% aqueous KOH to measure electrical resistance using direct readout AC and one square inch platinum electrodes. The results are reported in Table I below:

TABLE I

ELECTRICAL RESISTANCE IN POTASSIUM HYDROXIDE

| SAMPLE | DRY THICKNESS (MILS) | ELECTRICAL RESISTANCE (MILLIOHMS-IN$^2$) | |
|---|---|---|---|
| | | 30% KOH | 40% KOH |
| 1008 | 1.0 | 5 | 8 |
| 2016 | 2.0 | 10 | 16 |
| 4244 | 4.2 | 27 | 44 |
| PERMION 2291, 40/20 | 1.0 | 22 | 27 |
| CELLOPHANE, PUDO 193 | 1.0 | 8 | 11 |

As can be seen from Table I, the Samples according to the present invention all had significantly lower electrical resistance per mil of thickness than either the Permion or cellulose, making the battery separator of the invention eminently suitable for nickel-cadmium rechargeable vented aircraft batteries and nickel-zinc rechargeable batteries.

The oxidation resistance of sample 1008 was determined using the method developed by Kelley and Salkind. Chapter 8b; "Characteristics of Separators for Alkaline Silver Oxide Zinc Secondary Batteries", Edited by J. E. Cooper and A. Fleischer, Air Force Aeropropulsion Laboratory, Dayton, Ohio, September, 1965. The membrane sample is immersed in a mixture of potassium permanganate and sodium hydroxide for one hour at 50° C. and the weight loss measured. For comparison purposes Permion 2291, 40/20 and one mil cellophane PUDO 193 were also tested. The cellophane sample was tested at 25° C.

TABLE II

OXIDATION RESISTANCE

| Sample | ELECTRICAL RESISTANCE IN 40% KOH (MILLIOHMS-IN$^2$) | | WEIGHT LOSS (%) |
|---|---|---|---|
| | BEFORE TESTING | AFTER TESTING | |
| 1008 | 9 | 8 | 4.7 |
| PERMION 2291, 40/20 | 30 | 34 | 11.4 |
| CELLOPHANE, PUDO 193 | 12 | SAMPLE DISINTEGRATED | 82.2 |

Table II shows that the membrane according to the invention has excellent resistance to oxidation with little change in electrical properties. Compared to the prior art graft copolymer, the membrane of the present invention is superior both as to electrical resistance and oxidation resistance.

Table III below shows the increase in area of the membrane of the prior art and of the present invention when wetted and shows that equivalent dimensional stability can be obtained at lower electrical resistance when using the present invention.

TABLE III

ELECTRICAL RESISTANCE AND INCREASE IN AREA DUE TO WETTING WITH 40 % POTASSIUM HYDROXIDE

| Sample | ELECTRICAL RESISTANCE IN 40% KOH (MILLIOHMS-IN$^2$) | INCREASE IN AREA (%) |
|---|---|---|
| 1008 | 8 | 21 |
| PERMION 2291, 40/20 | 27 | 21 |

EXAMPLE 1a

The procedure of Example 1 is repeated except that 57 parts of methacrylic acid and 172 parts of acrylic acid were used as the monomers. The membranes had an electrical resistance of 9.5 milliohms-in$^2$ per mil of dry thickness.

EXAMPLE 2

The procedure of Example 1 is repeated except that the polymeric substrate was a polyethylene of 17.5 melt index and 0.96 density (Alathan 7050). Membranes similar to Samples 1008, 2016 and 4244 are obtained.

EXAMPLE 3

The procedure of Example 1 is repeated except that the polymeric substrate was a copolymer of ethylene and butylene, having a melt-index of 18 and a density of 0.955 (Marlex BMN-TR-880). Membranes similar to Samples 1008, 2016 and 4244 are obtained.

EXAMPLE 4

Example 1 is repeated, except that the amounts used were as follows:
1360 parts perchloroethylene
34.5 parts polyethylene (Alathon 7030)
32.8 parts acrylic acid
2 parts benzoyl peroxide in 80 parts perchloroethylene.

The reaction takes 3–4 minutes for the haze to appear. The graft copolymer is 51.3% polyethylene, 48.7% acrylic acid.

The cast film is cured at 90° to 100° C. in stepped increments over twenty minutes. Samples 1040 and 2080 are obtained at 1 and 2 mils dry thickness, respectively, each having an electrical resistance of 40 milliohms-in$^2$/mil. The oxidation resistance is as described above for Sample 1008, but the increase in area when wetted, is only 14%. Samples 1040 and 2080 are useful as separators in primary alkaline battery button cells of the silver-zinc type, or in secondary prismatic alkaline battery cells of the silver-zinc type.

EXAMPLE 5

The procedure of Example 1 is repeated, except that the chopped gel is mixed with 139 parts of polyethylene (Alathon 7030) dissolved in 6810 parts of perchloroethylene, and the mixture charged to the blender. The blender is cooled with an external cooling coil so that the contents of the blender are kept at about 30° C. during the high shear operation. Similarly, the shearing of the second gel is also carried out with the contents of the blender at about 30° C. The graft copolymer is 54.8% polyethylene, 45.2% acrylic acid.

Sample membranes are formed as in Example 1, and membranes of 1 and 2 mils are obtained. Sample 20118 was obtained having a dry thickness of 2.0 mils and an electrical resistance of 82 and 118 milliohms-in$^2$ in 30% and 40% KOH, respectively.

EXAMPLE 6

Membrane 2016 of Example 1 was used to form composite membrane-cellophane battery separators by placing pre-moistened membrane on cellophane film of 1 mil thickness and heating at 80° to 100° C. to promote adhesion. The resulting product is a laminate of membrane 2016 to cellophane.

The thixotropic liquid of Example 5 was poured onto a 1 mil cellophane film and the layer cured using the procedure of Example 5 to produce a membrane 20118/cellophane composite.

Table V below sets forth the properties of the products:

TABLE V

| MEMBRANE - CELLOPHANE SEPARATORS | | |
|---|---|---|
| | 2016/CEL-LOPHANE | 20118/CEL-LOPHANE |
| MEMBRANE DRY THICKNESS (MILS) | 2 | 2 |
| CELLOPHANE DRY THICKNESS (MILS) | 1 | 1 |
| COMPOSITE ELECTRICAL RESISTANCE IN 40% KOH (MILLIOHMS-IN$^2$) | 28 | 130 |

Both products are designed for primary silver-zinc button cell use. The 2016/cellophane separator is useful for high rate applications and the 20118/cellophane for low rate, long life applications.

EXAMPLE 7

Membrane 2016 is laminated at 150° C. and 10 psig to a film of microporous PVC that has previously been made permanently wettable by grafting with acrylic acid using the plasma grafting process of U.S. Pat. No. 3,600,122. The laminated separator is used in low drain mercury-zinc primary alkaline battery button cells and rechargeable and primary silver-zinc alkaline battery button cells. The properties are set forth in Table VI below:

TABLE VI

| 2016 MEMBRANE-MICROPOROUS COMPOSITE SEPARATOR THICKNESS AND ELECTRICAL RESISTANCE | |
|---|---|
| 2016 MEMBRANE THICKNESS (MILS) | 2 |
| MICROPOROUS PVC THICKNESS (MILS) | 10 |
| COMPOSITE THICKNESS (MILS) | 12 |
| 2016 MEMBRANE RESISTANCE IN 40% KOH (MILLIOHMS-IN$^2$) | 16 |
| MICROPOROUS PVC RESISTANCE IN 40% KOH (MILLIOHMS-IN$^2$) | 25 |
| COMPOSITE RESISTANCE IN 40% KOH (MILLIOHMS-IN$^2$) | 41 |

The battery separators produced by the present process possess the following desirable properties as compared to prior art separators prepared by conventional radiation grafting techniques.

1. The present battery separators have low electrical resistance in alkaline electrolyte combined with dimensional stability as shown above.
2. The present battery separators have high reliability in the preparation of low resistance membranes for low temperature battery operation. Prior art radiation grafted membranes are prepared by allowing monomer to diffuse into a film as the result of swelling the film with a solvent in the presence of gamma radiation. To obtain low electrical resistance, the reaction time is increased and undesirable side reactions form a homopolymer which tends to fuse the film and make it difficult or impossible to handle. In manufacturing the present battery separator membranes, the materials are simply weighed out as required for particular electrical properties and formed into a film with no undesirable side reactions taking place.
3. The present battery separators have high reliability in the preparation of high resistance membranes for decreased ionic diffusion in low rate, long life electronic alkaline battery applications. When preparing prior art high resistance radiation grafted membranes, the monomer diffusion is difficult to control because it is a function of time, temperature, concentration, radiation level and film thickness and consequently the diffusion is often too high. To manufacture the present membranes, the monomer is simply measured out and reacted to form a castable mixture.
4. The present battery separators are heat sealable in the battery manufacturing process. It is sometimes desirable to wrap battery electrodes with a copolymer membrane and to heat seal the edges using conventional heat sealing techniques. Copolymer membranes prepared by prior art radiation grafting are not heat sealable while the present membranes are heat sealable using conventional heat sealing methods.
5. The present battery separators are sterilizable when dry at temperatures up to 160° C. without loss of electrical properties. In certain aerospace applications, it is desirable to sterilize the battery with the separator in a dry condition and to add the electrolyte during the space flight. When prior art radiation grafted separators are sterilized dry, they undergo substantial loss of electrical properties whereby the electrical resistance increases by approximately 200%. The present membranes can be sterilized dry with no change in electrical properties.
6. The present membranes can be formed on a substrate. In many battery applications, it is desirable to form a copolymer membrane directly on the surface of a substrate for the purposes of handleability in the manufacture of batteries, especially where small discs are blanked out with high speed punches in the manufacture of alkaline button cells. Membranes manufactured by prior art radiation grafting cannot be attached to a substrate, such as a cellulosic film, a non-woven fabric or a microporous material without the use of heat, pressure or an adhesive. The present membranes can be cast directly on a substrate, thus eliminating the need for a secondary manufacturing operation.

While the Examples show separators of 1 to more than 4 mils thickness, the battery separators of the invention can be prepared to any desired thickness by control over the thickness of the layer of casting liquid, as is known in the film casting art, and/or by use of several layers of membrane. Total separator thickness of about 0.25 to about 9.0 mils, preferably about 0.25 to about 2.0 mils, is conventional and is readily achieved by the present invention. Furthermore, the use of laminated structures, either by casting the thixotropic liquid on a support or laminating a membrane to a support, also affords control over separator thickness. The support can be an electrode plate, a cellulose film or sheet, a non-woven fabric, microporous plastic film or sheet, or even a membrane according to the invention.

What is claimed is:

1. A process for preparing a graft copolymer film, sheet or coating, which comprises forming a reaction mixture comprising an organic polymeric substrate and an ethylenically unsaturated monomer dissolved in an organic solvent, initiating graft copolymerization of said polymeric substrate and said monomer by forming free radicals on said polymeric substrate in said reaction mixture and copolymerizing and crosslinking said polymeric substrate and said monomer while dissolved in said solvent to form a crosslinked graft copolymer of said polymeric substrate and said monomer in the form of a gel, subjecting said graft copolymer in said solvent to high shear forces to convert it from a gel to a thixotropic suspension containing said graft copolymer, forming said thixotropic suspension into a layer thereof on a support, and removing the solvent from said layer thereby to form the film, sheet or coating.

2. The process according to claim 1, wherein prior to forming the thixotropic suspension into the layer thereof on the support, a portion of the solvent is removed from said thixotropic suspension to produce a more concentrated thixotropic suspension.

3. The process according to claim 2, wherein said portion of the solvent is removed by allowing the thixotropic suspension to regel and decanting solvent from said regelled product, said regelled product then being subjected to the high shear forces to form said more concentrated thixotropic suspension.

4. The process according to claim 1, wherein said film sheet or coating is removed from said support.

5. The process according to claim 1, wherein said film sheet or coating is adhered to said support.

6. The process according to claim 5, wherein said support is selected from the group consisting of non-woven material, microporous cellophane film or cellulose film.

7. The process according to claim 1, wherein said polymeric substrate is selected from the group consisting of homopolymers and copolymers of olefins, polyesters, polyvinylchloride, polyvinylidene chloride, polyvinylalcohol, polystyrene, polyvinylketones, polyamides, polyurethanes, polyvinylethers, polyacrylonitrile, polybutadiene and isoprene.

8. The process according to claim 1, wherein said polymeric substrate is selected from the group consisting of polyolefins, polyamides and poly(vinylhalides).

9. The process according to claim 1, wherein said polymeric substrate is selected from the group consisting of polyolefins having a molecular weight of from about 10,000 to 2 or 3 million.

10. The process according to claim 1, wherein said ethylenically unsaturated monomer is selected from the group consisting of ethylenically unsaturated organic acids, alcohols, ethers, ketones, esters, aldehydes, isocyanates, sulfonates, mercaptans, thioethers, disulfides, nitriles, nitrocompounds, amines, amides and halides.

11. The process according to claim 1, wherein said ethylenically unsaturated monomer is an ethylenically unsaturated carboxylic acid.

12. The process according to claim 1, wherein the ratio of said polymeric substrate to monomer is from about 50:1 to about 1:10.

13. The process according to claim 1, wherein said free radicals are formed on said polymeric substrate by irradiating said reaction mixture with ionizing radiation.

14. The process according to claim 1, wherein a free radical catalyst is dissolved in said reaction mixture to form free radicals on said polymeric substrate.

15. The process according to claim 14, wherein said free radical catalyst is a peroxide catalyst.

16. The process according to claim 14, wherein said free radical catalyst is an azo catalyst.

17. The process according to claim 15, wherein said peroxide catalyst is selected from the group consisting of alkyl, acyl and ketone peroxides, hydroperoxides, peresters and peroxy carbonates.

18. The process according to claim 14, wherein said free radical catalyst is present in an amount of from about 0.1 to about 10% by weight of said polymeric substrate and said monomer.

19. The process according to claim 14, wherein said reaction mixture is heated to a temperature of from about 60° to about 170° C.

20. The process according to claim 1, wherein said gels are subjected to said high shear forces while at a temperature of from about 30° to about 100° C.

21. The process according to claim 1 wherein said polymeric substrate is selected from the group consisting of the polyolefins, the polyamides and the polyvinylhalides and wherein said ethylenically unsaturated monomer is an ethylenically unsaturated carboxylic acid or a salt, anhydride or ester thereof.

* * * * *